US011946007B1

(12) United States Patent
Liu et al.

(10) Patent No.: US 11,946,007 B1
(45) Date of Patent: Apr. 2, 2024

(54) NATURAL GAS SEPARATION AND PURIFICATION AND MERCURY COLLECTION SYSTEM FOR OIL AND GAS WELLS, AND METHOD OF USE THEREOF

(71) Applicant: Peking University, Beijing (CN)

(72) Inventors: Quanyou Liu, Beijing (CN); Pengpeng Li, Beijing (CN); Jiarun Liu, Beijing (CN)

(73) Assignee: Peking University, Beijing (CN)

(*) Notice: Subject to any disclaimer, the term of this patent is extended or adjusted under 35 U.S.C. 154(b) by 0 days.

(21) Appl. No.: 18/518,606

(22) Filed: Nov. 24, 2023

(30) Foreign Application Priority Data

May 31, 2023 (CN) .......................... 202310629307.7

(51) Int. Cl.
*B01D 45/16* (2006.01)
*B01D 53/00* (2006.01)
*B01D 53/30* (2006.01)
*C10L 3/10* (2006.01)

(52) U.S. Cl.
CPC .............. *C10L 3/101* (2013.01); *B01D 45/16* (2013.01); *B01D 53/002* (2013.01); *B01D 53/30* (2013.01); *B01D 2256/24* (2013.01); *B01D 2257/602* (2013.01)

(58) Field of Classification Search
None
See application file for complete search history.

(56) References Cited

U.S. PATENT DOCUMENTS

2015/0080626 A1* 3/2015 Boon ....................... C10K 3/04
585/242
2015/0343377 A1* 12/2015 Drechsel .................. B09B 3/00
422/174

FOREIGN PATENT DOCUMENTS

CN 209215318 U 8/2019
CN 113493709 A 10/2021

* cited by examiner

*Primary Examiner* — Tam M Nguyen
(74) *Attorney, Agent, or Firm* — Bayramoglu Law Offices LLC

(57) ABSTRACT

A natural gas separation and purification and mercury collection system for oil and gas wells includes a cyclone separator, a condensation purification and separation mechanism, pressure buffer mechanisms, mercury collection and separation mechanisms, and natural gas storage tanks. An inlet end of the cyclone separator is communicated with an external gas source through a pressure buffer mechanism, and an outlet end of the cyclone separator is communicated with the condensation purification and separation mechanism through a pressure buffer mechanism. The condensation purification and separation mechanism is communicated with the mercury collection and separation mechanism through a pressure buffer mechanism. The mercury collection and separation mechanism is communicated with the natural gas storage tank through a guide tube. A method of use of the natural gas separation and purification and mercury collection system includes gas collection, gas purification, mercury separation, and mercury analysis.

12 Claims, 7 Drawing Sheets

NATURAL GAS SEPARATION AND PURIFICATION AND MERCURY COLLECTION SYSTEM FOR OIL AND GAS WELLS, AND METHOD OF USE THEREOF

CROSS REFERENCE TO THE RELATED APPLICATIONS

This application is based upon and claims priority to Chinese Patent Application No. 202310629307.7, filed on May 31, 2023, the entire contents of which are incorporated herein by reference.

TECHNICAL FIELD

The present disclosure relates to a device for separation and collection of mercury in natural gas, in particular to a natural gas separation and purification and mercury collection system for oil and gas wells, and a method of use thereof.

BACKGROUND

During thermal evolution of gas source rocks into hydrocarbons, mercury, as a volatile component, accumulates in natural gas reservoirs along with natural gas. The mercury content in natural gas is directly related to the safety of transmission pipelines, the physical health of residents along the line, the pollution of the ecological environment, and the corrosion prevention of equipment in other uses of natural gas such as power generation. However, due to the limitations of research methods, especially due to the immaturity of collection and analysis methods for vaporous mercury in natural gas, effective collection and research of vaporous mercury is currently difficult to achieve in the oil and gas industry. This is mainly reflected in the significant obstacles to mercury collection and the difficulty of accurate quantitative analysis. In order to solve this problem, various mercury content measurement techniques or devices have been developed. For example, Chinese patent application 2020102501537 proposes a mercury removal device for undersaturated wet natural gas, and Chinese patent application 2018216245892 proposes an experimental device for evaluating mercury removal performance of a removal agent for mercury in natural gas.

Currently, traditional techniques can achieve the purpose of mercury measurement to a certain extent. However, in practical work such as measurement and experimentation, they have varying degrees of problems, such as long sample collection time, and the need for an adsorbent with a very large specific surface area. These problems affect the efficiency and accuracy of mercury separation and measurement, resulting in complex equipment structure, high operating and maintenance costs, and easy impact on normal production activities of oil and gas industries during the sampling process.

In view of the actual situation of current mercury separation and detection operations for natural gas, based on years of on-site work experience, the present disclosure provides a natural gas separation and purification and mercury collection system for oil and gas wells, and a method of use thereof so as to solve the problems existing in the current practical work.

SUMMARY

An objective of the present disclosure is to provide a natural gas separation and purification and mercury collection system for oil and gas wells, and a method of use thereof. On the one hand, the present disclosure features simple operation, short sampling time, and sufficient mercury removal, and can effectively achieve the separation of natural gas and mercury, thereby improving the detection accuracy of mercury content in natural gas. On the other hand, the present disclosure avoids affecting normal production activities of the oil and gas industries during the sampling process, effectively improves the detection efficiency and accuracy, and reduces the operation and maintenance difficulty and cost of detection equipment.

In order to achieve the above objective, the present disclosure provides a natural gas separation and purification and mercury collection system for oil and gas wells, and a method of use thereof.

A natural gas separation and purification and mercury collection system for oil and gas wells includes a cyclone separator, a condensation purification and separation mechanism, pressure buffer mechanisms, mercury collection and separation mechanisms, natural gas storage tanks, and a driver circuit, where an inlet end of the cyclone separator is communicated with an external gas source through a pressure buffer mechanism, and an outlet end of the cyclone separator is communicated with the condensation purification and separation mechanism through a pressure buffer mechanism; the condensation purification and separation mechanism is communicated with the mercury collection and separation mechanism through a pressure buffer mechanism; the mercury collection and separation mechanism is communicated with the natural gas storage tank through a guide tube; the cyclone separator, the condensation purification and separation mechanism, the pressure buffer mechanisms, the mercury collection and separation mechanisms, and the natural gas storage tanks each are provided with a control valve; the cyclone separator, the condensation purification and separation mechanism, the pressure buffer mechanisms, the mercury collection and separation mechanisms, the natural gas storage tanks, and each control valve are electrically connected to the driver circuit; there are at least two mercury collection and separation mechanisms; and the mercury collection and separation mechanisms are connected in parallel to each other and communicated with the pressure buffer mechanisms and the natural gas storage tanks through a shunt.

Further, the mercury collection and separation mechanisms are connected to each other through a bearing frame; the bearing frame is a cylindrical frame with an I-shaped axial section; the mercury collection and separation mechanisms are embedded in a trough at a side surface of the bearing frame and distributed in parallel to an axis of the bearing frame; the pressure buffer mechanisms communicated with the mercury collection and separation mechanisms are connected to an outer side of the bearing frame; the mercury collection and separation mechanisms each are communicated with a pressure buffer mechanism and communicated with the shunt through the pressure buffer mechanism; each shunt is connected to an upper end surface of the bearing frame; the mercury collection and separation mechanisms each are further communicated with the natural gas storage tank through the shunt; a wall of the trough at the side surface of the bearing frame is provided with a guide way and connected to the mercury collection and separation mechanisms through the guide way; each two adjacent mercury collection and separation mechanisms are isolated by a partition; a bearing chamber is provided in the bearing frame and is coaxial with the bearing frame; the outer side of the bearing frame is provided with at least one connecting clip; a natural gas storage tank is provided in the bearing chamber; and the outer side of the bearing frame is connected to at least one natural gas storage tank through the connecting clip.

Further, at least one electric heating wire and a temperature sensor are further provided in the carrier; the electric heating wire is spirally distributed around an axis of the carrier, and is 0-5 mm far from the gold foil mesh; the temperature sensor is coaxial with the carrier; and the electric heating wire and the temperature sensor are electrically connected to the driver circuit.

Further, the mercury collection and separation mechanism includes a separation tank, carriers, gold foil meshes, an aerator, a partition, a guide fan, heat exchange tubes, a temperature-humidity sensor, and pressure-flow sensors; the separation tank is a closed chamber structure with a rectangular axial section; the separation tank includes an upper end surface provided with a gas inlet and a gas outlet, and a bottom provided with a drain outlet; the gas inlet and the gas outlet are distributed at two sides of an axis of the separation tank; the partition is embedded in the separation tank and connected to a top and a side wall of the separation tank; a distance between the partition and the bottom of the separation tank does not exceed 10% of a height of the separation tank; the partition divides the separation tank into a mercury removal chamber and a gas discharge chamber; the gas inlet is communicated with the mercury removal chamber, and the gas outlet is communicated with the gas discharge chamber; the carrier is a closed and circular structure, and is provided with 1-2 gold foil meshes; the carriers are embedded in the mercury removal chamber, coaxial with the mercury removal chamber, and slidably connected to an inner side of the mercury removal chamber through sliding rails; a distance between each two adjacent carriers is not less than 10 mm; the aerator is communicated with the gas inlet, located inside the mercury removal chamber, and connected to a top of the separation tank; there are at least two heat exchange tubes, including a first heat exchange tube located below the partition, connected to the bottom of the separation tank, and surrounding the axis of the separation tank, and a second heat exchange tube embedded in the gas discharge chamber and connected to a side wall of the separation tank corresponding to the gas discharge chamber; an outer side of the separation tank corresponding to the second heat exchange tube is provided with a pipe joint and communicated with the external condensation purification and separation mechanism through the pipe joint; the temperature-humidity sensor is embedded in the gas outlet; the gas inlet and the gas outlet each are provided with a pressure-flow sensor; at least one guide fan is connected to the bearing frame and communicated with the gas outlet and the shunt through a guide tube; the guide fan is communicated with the natural gas storage tank through the shunt; and the guide fan, the temperature-humidity sensor, and the pressure-flow sensors are electrically connected to the driver circuit.

Further, the condensation purification and separation mechanism includes a support frame, gas-liquid separators, a refrigeration mechanism, a condensation chamber, and pressure regulating pumps; the support frame is a frame structure with a T-shaped axial section, and an axis of the support frame is perpendicular to a horizontal plane; the condensation chamber is embedded in the support frame, coaxial with the support frame, and connected to a bottom of the support frame; the condensation chamber includes a side wall provided with a gas inlet and a top provided with a gas outlet; the gas inlet is communicated with the cyclone separator, and the gas outlet is communicated with a plurality of gas-liquid separators through a guide tube; at least two gas-liquid separators are embedded in an upper half of the support frame and uniformly surround the axis of the support frame; the gas-liquid separators are connected in parallel to each other and communicated with the gas outlet of the condensation chamber through the pressure regulating pumps; the refrigeration mechanism is connected to an outer side of the support frame and communicated with the mercury collection and separation mechanism through a circulation loop; and the gas-liquid separators, the refrigeration mechanism, the condensation chamber, and the pressure regulating pumps are electrically connected to the driver circuit.

Further, the condensation chamber includes a guide chamber, heat exchangers, aeration trays, and a temperature sensor; the guide chamber is a truncated cone-shaped structure; a bottom of the guide chamber is provided with a drain outlet that is coaxial with the guide chamber; the gas inlet is located at a side wall of the guide chamber, and is not less than 5 cm far from the bottom of the guide chamber; at least two aeration trays are embedded in the guide chamber, connected to the bottom of the guide chamber, uniformly distributed around the drain outlet, and communicated with the gas inlet; at least two heat exchangers are embedded in the guide chamber and coaxial with the guide chamber; the heat exchangers are connected to the side wall of the guide chamber; a distance between each two adjacent heat exchangers is 10-30% of a height of the guide chamber; the heat exchangers are connected in parallel to each other and communicated with the refrigeration mechanism to form a closed circulation loop; and the temperature sensor is connected to a top of the condensation chamber and electrically connected to the driver circuit.

Further, the pressure buffer mechanism includes a buffer tank, an elastic diaphragm, a bearing keel, a pressure equalizing pump, a counterweight, guide rails, pressure sensors, and a wedge; an axis of the buffer tank is perpendicular to the horizontal plane, and the buffer tank is a cylindrical closed chamber structure with a rectangular axial section; a side wall of the buffer tank is provided with at least one gas inlet; the gas inlet uniformly surrounds the axis of the buffer tank, and a distance between the gas inlet and a bottom of the buffer tank is 5-15% of a height of the buffer tank; a top of the buffer tank is provided with a gas guide port and communicated with an external pipe through the gas guide port; the bearing keel is embedded in the buffer tank and is a spoke-shaped frame structure coaxial with the buffer tank; the bearing keel is slidably connected to an inner side of the buffer tank through a plurality of guide rails; the elastic diaphragm is wrapped around the bearing keel; the elastic diaphragm and the bearing keel jointly divide an inner space of the buffer tank into a pressure regulating chamber and a gas discharge chamber that are independent of each other from top to bottom; the pressure equalizing pump is located on the bearing keel and coaxial with the bearing keel; the pressure regulating chamber and the gas discharge chamber are communicated with each other through the pressure equalizing pump; the counterweight is a circular structure coaxial with the bearing keel and is connected to an upper end surface of the bearing keel; at least two gas pressure sensors are respectively connected to the upper end surface and a lower end surface of the bearing keel and electrically connected to the driver circuit; at least one wedge is embedded in the gas discharge chamber and connected to the top of the buffer tank; and the wedge has an axis perpendicular to the elastic diaphragm, and has a height not less than 10 cm.

Further, a bearing spring is provided in the guide rail, and the guide rail is connected to the bearing keel through the bearing spring; the bearing spring is distributed in parallel to an axis of the guide rail; the upper end surface of the bearing keel is provided with a mounting groove at the position corresponding to the counterweight; and when there are two or more counterweights, the counterweights are connected to the upper end surface of the bearing keel and distributed in a concentric circular structure.

Further, the driver circuit is a circuit system based on either a field-programmable gate array (FPGA) chip or a programmable controller; and the driver circuit is provided with a communication port and a control interface based on any one or a combination of a display, a button, and a potentiometer.

A method of use of the natural gas separation and purification and mercury collection system in oil and gas wells includes the following steps.

S1: gas collection: vacuuming the cyclone separator, the condensation purification and separation mechanism, the pressure buffer mechanisms, the mercury collection and separation mechanisms, and the natural gas storage tanks; driving, after the vacuuming, the electric heating wire of the mercury collection and separation mechanism to heat the gold foil meshes to 500-700° C., and holding the temperature for 3-5 min; cooling, after the holding, the gold foil meshes naturally to room temperature; conducting, by the pressure buffer mechanism, a pressure regulation on high-pressure natural gas collected from an oil or gas well, and delivering the regulated natural gas to the cyclone separator; and separating, by the cyclone separator, a solid particle and a liquid droplet in the natural gas to generate gaseous natural gas as initial experimental gas;

S2: gas purification: conducting, by the pressure buffer mechanism, a secondary pressure regulation on the experimental gas generated in step S1; delivering, after the secondary pressure regulation, the experimental gas to the condensation purification and separation mechanism; condensing, by the condensation purification and separation mechanism, an impurity in a vaporous form in the experimental gas through a low-temperature environment; retaining the impurity separated in droplet and crystal forms in the condensation purification and separation mechanism; conducting, by the condensation purification and separation mechanism, gas-liquid separation on the experimental gas after the condensation purification; and conducting a secondary purification on the experimental gas to generate stable-pressure and clean experimental gas;

S3: mercury separation: conducting, by the pressure buffer mechanism, a pressure regulation on the stable-pressure and clean experimental gas generated through the secondary purification in step S2; delivering the stable-pressure and clean experimental gas to the mercury collection and separation mechanisms, and detecting a total input amount of the experimental gas entering the mercury collection and separation mechanisms; allowing, when the stable-pressure and clean experimental gas passes through the mercury collection and separation mechanism, the gold foil meshes in the mercury collection and separation mechanism to react with mercury in the stable-pressure and clean experimental gas so as to generate amalgam, thereby separating the mercury from the natural gas; delivering, after the mercury separation, the natural gas to the natural gas storage tank; and comparing a storage capacity of the natural gas in the natural gas storage tank with the total input amount of the experimental gas delivered to the mercury collection and separation mechanism to acquire a separated mercury content; and S4: mercury analysis: collecting, after the experimental gas is collected by the natural gas storage tank, the amalgam generated by the reaction in the mercury collection and separation mechanism; transferring the collected amalgam to a mercury analysis device for analysis, and then determining an isotopic content of the amalgam; and comparing a determined value with the mercury content acquired in step S3, and making a correction to acquire an accurate natural gas content and an accurate mercury content in a mixed gas collected from the oil or gas well.

Compared with the prior art, the present disclosure has a high level of equipment integration and modularization and flexible and convenient operation. On the one hand, the present disclosure features simple operation, short sampling time, and sufficient mercury removal, and can effectively achieve the separation of natural gas and mercury, thereby improving the detection accuracy of mercury content in natural gas. On the other hand, the present disclosure avoids affecting normal production activities of the oil and gas industries during the sampling process, effectively improves the detection efficiency and accuracy, and reduces the operation and maintenance difficulty and cost of detection equipment.

DETAILED DESCRIPTION OF THE EMBODIMENTS

Figure 1:
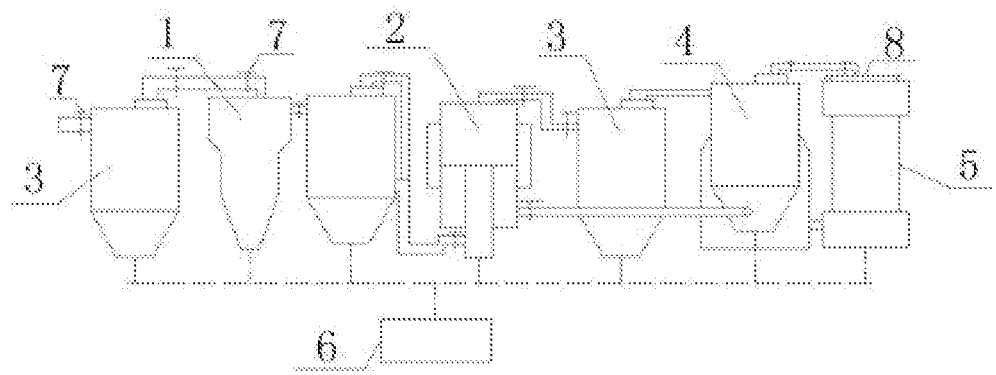
FIG. 1 is a structural diagram of a natural gas separation and purification and mercury collection system for oil and gas wells according to the present disclosure.
Figure 2:
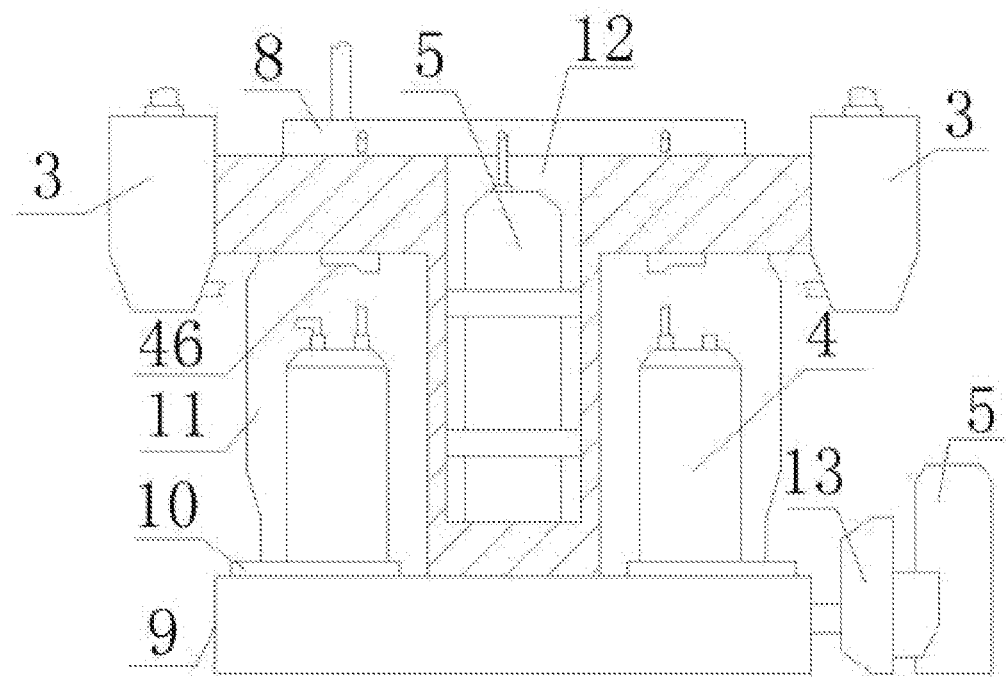
FIG. 2 is a partial connection diagram of a mercury collection and separation mechanism and a bearing frame.
Figure 3:
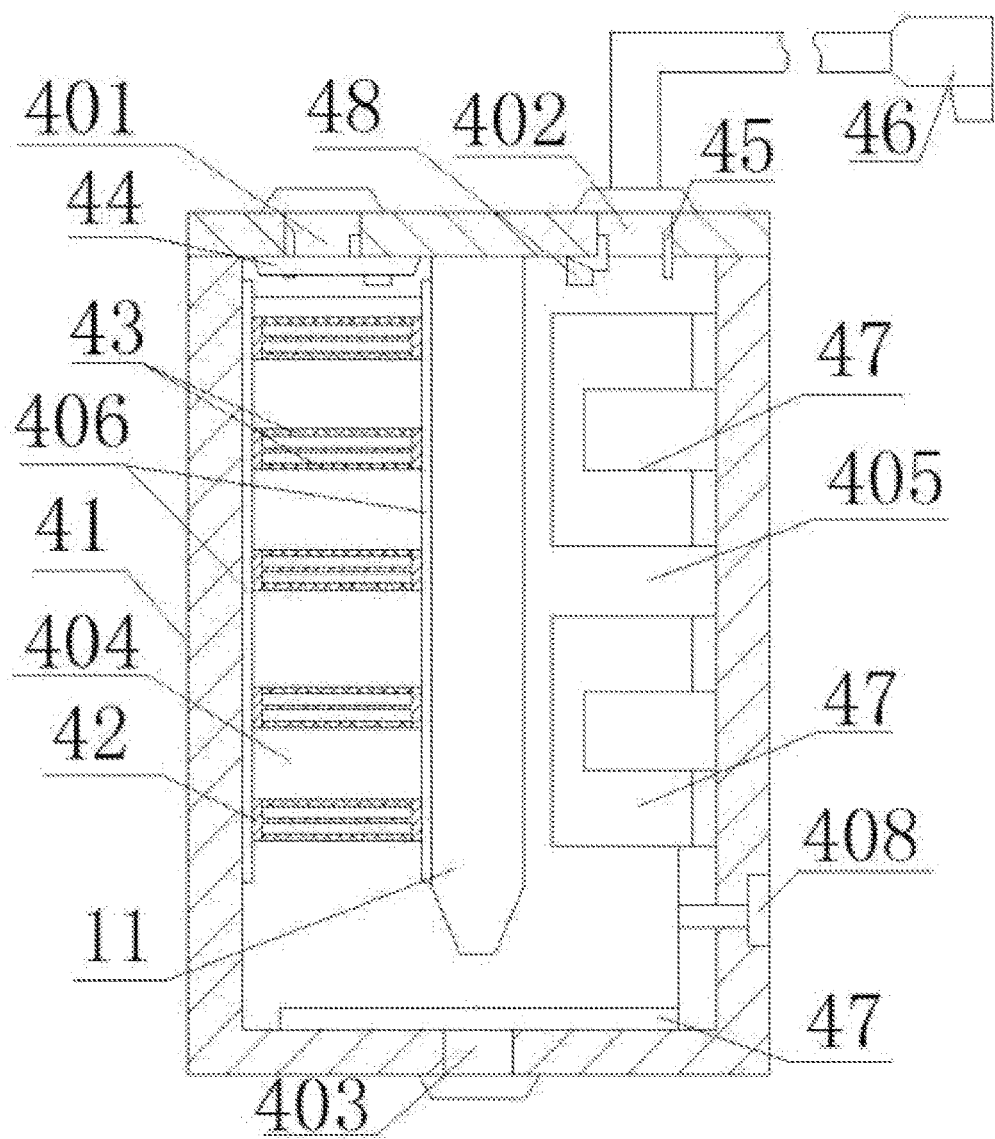
FIG. 3 is a partial structural diagram of the mercury collection and separation mechanism.
Figure 4:
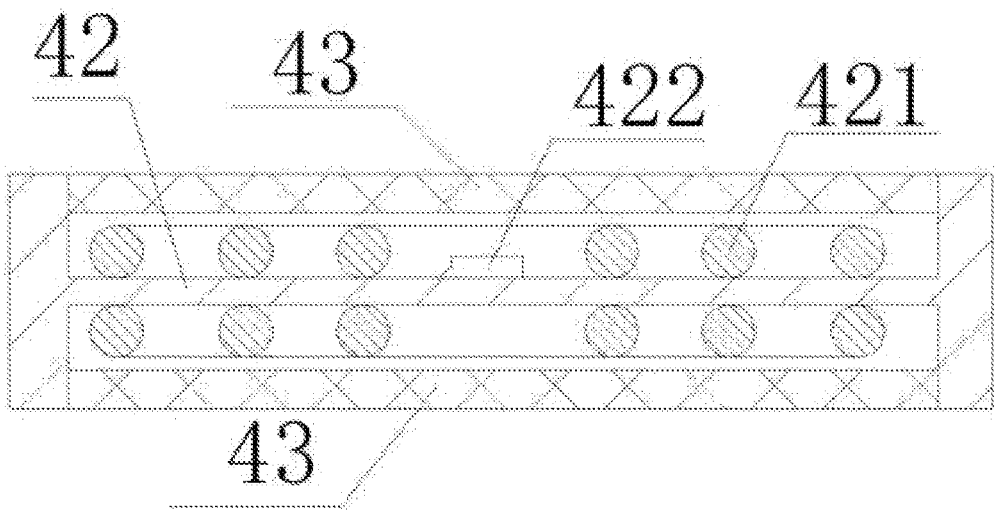
FIG. 4 is a partial section view of a carrier.
Figure 5:
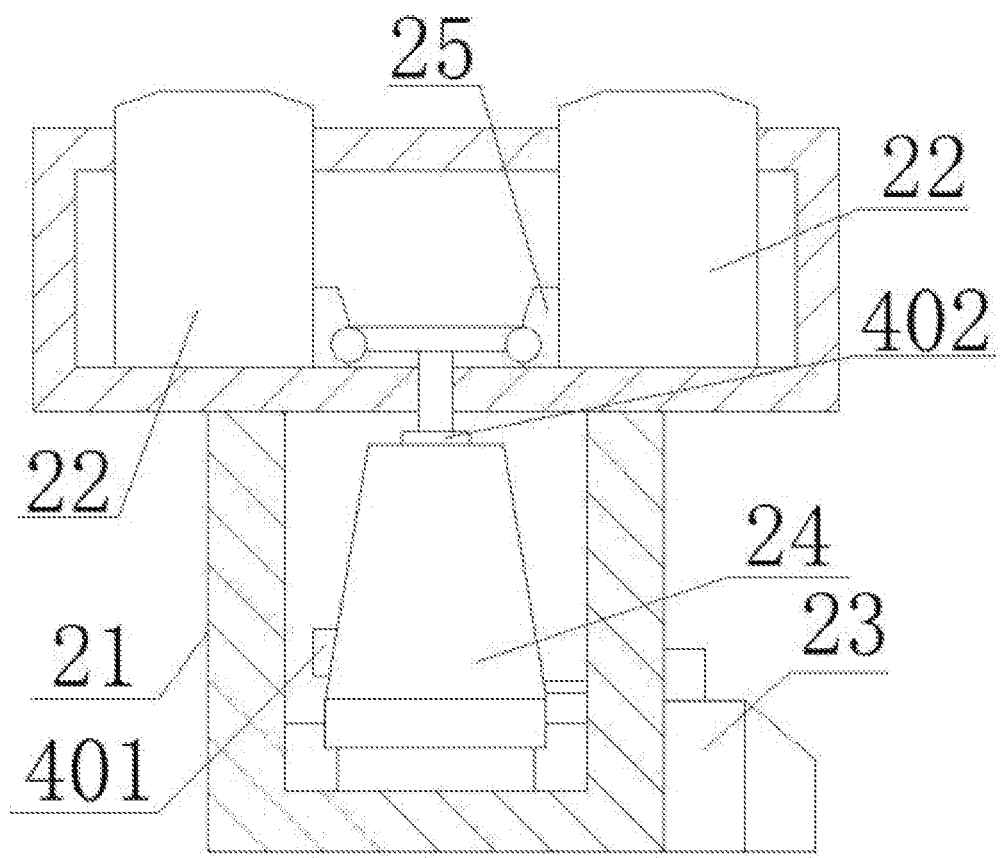
FIG. 5 is a partial section view of a condensation purification and separation mechanism.
Figure 6:
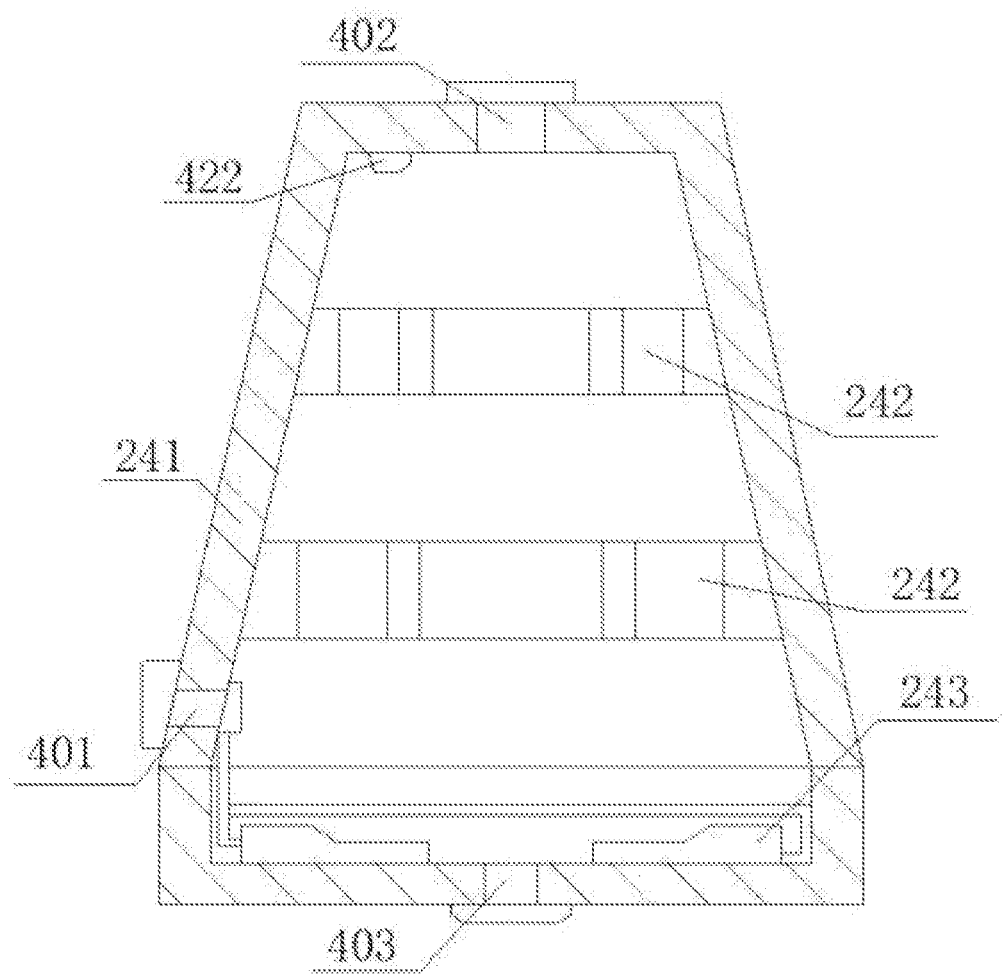
FIG. 6 is a partial section view of a condensation chamber.
Figure 7:
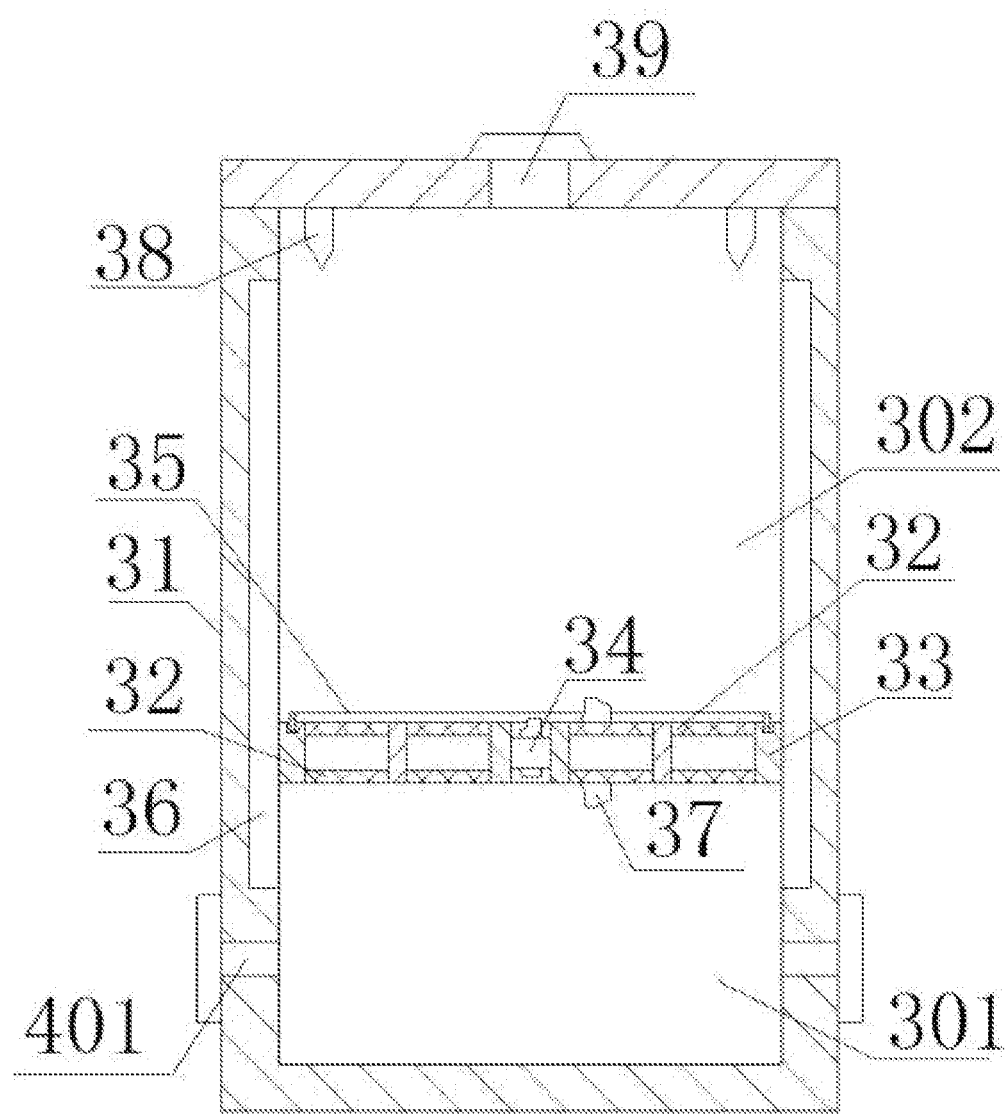
FIG. 7 is a section view of a pressure buffer mechanism.
Figure 8:
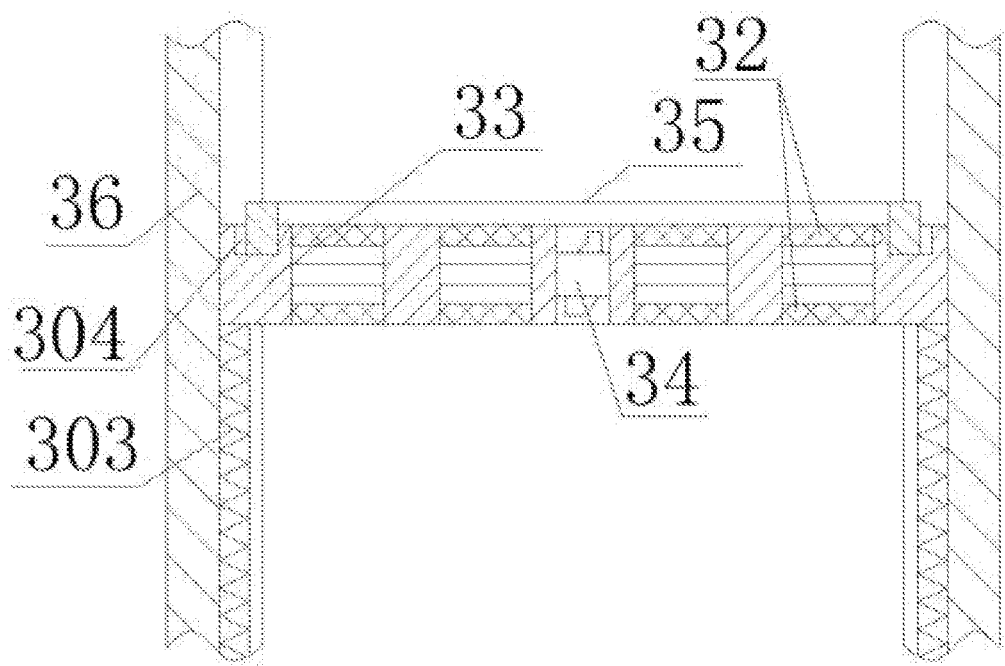
FIG. 8 is a connection diagram of a bearing keel of the pressure buffer mechanism.

The technical solutions of the embodiments of the present disclosure are clearly and completely described below with reference to the drawings in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

Referring to FIGS. 1 to 8, a natural gas separation and purification and mercury collection system for oil and gas wells includes cyclone separator 1, condensation purification and separation mechanism 2, pressure buffer mechanisms 3, mercury collection and separation mechanisms 4, natural gas storage tanks 5, and driver circuit 6. An inlet end of the cyclone separator 1 is communicated with an external gas source through a pressure buffer mechanism 3, and an outlet end of the cyclone separator 1 is communicated with the condensation purification and separation mechanism 2 through a pressure buffer mechanism 3. The condensation purification and separation mechanism 2 is communicated with the mercury collection and separation mechanism 4 through a pressure buffer mechanism 3. The mercury collection and separation mechanism 4 is communicated with the natural gas storage tank 5 through a guide tube. The cyclone separator 1, the condensation purification and separation mechanism 2, the pressure buffer mechanisms 3, the mercury collection and separation mechanisms 4, and the natural gas storage tanks 5 each are provided with control valve 7. The cyclone separator 1, the condensation purification and separation mechanism 2, the pressure buffer mechanisms 3, the mercury collection and separation mechanisms 4, the natural gas storage tanks 5, and each control valve 7 are electrically connected to the driver circuit 6. There are at least two mercury collection and separation mechanisms 4. The mercury collection and separation mechanisms 4 are connected in parallel to each other, and each of the mercury collection and separation mechanisms 4 is communicated with the pressure buffer mechanism 3 and the natural gas storage tank 5 through shunt 8.

In this embodiment, the mercury collection and separation mechanisms 4 are connected to each other through bearing frame 9. The bearing frame 9 is a cylindrical frame with an I-shaped axial section. The mercury collection and separation mechanisms 4 are embedded in a trough at a side surface of the bearing frame 9 and distributed in parallel to an axis of the bearing frame 9. The pressure buffer mechanisms 3 communicated with the mercury collection and separation mechanisms 4 are connected to an outer side of the bearing frame 9. The mercury collection and separation mechanisms 4 each are communicated with a pressure buffer mechanism 3 and communicated with the shunt 8 through the pressure buffer mechanism 3. Each shunt 8 is connected to an upper end surface of the bearing frame 9. The mercury collection and separation mechanisms 4 each are further communicated with the natural gas storage tank 5 through the shunt 8. A wall of the trough at the side surface of the bearing frame 9 is provided with guide way 10, and is connected to the mercury collection and separation mechanisms 4 through the guide way 10. Each two adjacent mercury collection and separation mechanisms 4 are isolated by partition 11. Bearing chamber 12 is provided in the bearing frame 9 and is coaxial with the bearing frame. The outer side of the bearing frame is provided with at least one connecting clip 13. A natural gas storage tank 5 is provided in the bearing chamber 12. The outer side of the bearing frame 9 is connected to at least one natural gas storage tank 5 through the connecting clip 13.

It should be emphasized that the mercury collection and separation mechanism 4 includes separation tank 41, carriers 42, gold foil meshes 43, aerator 44, partition 11, guide fan 46, heat exchange tubes 47, temperature-humidity sensor 48, and pressure-flow sensors 45. The separation tank 41 is a closed chamber structure with a rectangular axial section. The separation tank includes an upper end surface provided with gas inlet 401 and gas outlet 402, and a bottom provided with drain outlet 403. The gas inlet 401 and the gas outlet 402 are distributed at two sides of an axis of the separation tank 41. The partition 11 is embedded in the separation tank 41 and connected to a top and a side wall of the separation tank 41. A distance between the partition 11 and the bottom of the separation tank 41 does not exceed 10% of a height of the separation tank 41. The partition 11 divides the separation tank 41 into mercury removal chamber 404 and gas discharge chamber 405. The gas inlet 401 is communicated with the mercury removal chamber 404, and the gas outlet 402 is communicated with the gas discharge chamber 405. The carrier 42 is a closed and circular structure, and is provided with 1-2 gold foil meshes 43. The carriers 42 are embedded in the mercury removal chamber 404, coaxial with the mercury removal chamber 404, and slidably connected to an inner side of the mercury removal chamber 404 through sliding rails 406. A distance between each two adjacent carriers 42 is not less than 10 mm. The aerator 44 is communicated with the gas inlet 401, located inside the mercury removal chamber 404, and connected to a top of the separation tank 41. There are at least two heat exchange tubes 47. Among them, a first heat exchange tube is located below the partition 11, connected to the bottom of the separation tank 41, and surrounding the axis of the separation tank 41, and a second heat exchange tube is embedded in the gas discharge chamber 405 and connected to a side wall of the separation tank 41 corresponding to the gas discharge chamber 405. An outer side of the separation tank 41 corresponding to the second heat exchange tube 47 is provided with pipe joint 408 and communicated with the external condensation purification and separation mechanism 2 through the pipe joint 408. The temperature-humidity sensor 48 is embedded in the gas outlet 402. The gas inlet 401 and the gas outlet 402 each are provided with a pressure-flow sensor 45. At least one guide fan 46 is connected to the bearing frame 9 and communicated with the gas outlet 402 and the shunt 8 through a guide tube. The guide fan 46 is communicated with the natural gas storage tank 5 through the shunt 8. The guide fan 46, the temperature-humidity sensor 48, and the pressure-flow sensors 45 are electrically connected to the driver circuit 6.

Further optimally, at least one electric heating wire 421 and a temperature sensor 422 are further provided in the carrier 42. The electric heating wire 421 is spirally distributed around an axis of the carrier 42, and is 0-5 mm far from the gold foil mesh 43. The temperature sensor 422 is coaxial with the carrier 42. The electric heating wire 421 and the temperature sensor 422 are electrically connected to the driver circuit 6.

The electric heating wire 421 is configured to preheat the gold foil mesh 422 before mercury separation, so as to clean up an impurity from a surface of the gold foil mesh 422.

In addition, the condensation purification and separation mechanism 2 includes support frame 21, gas-liquid separators 22, refrigeration mechanism 23, condensation chamber 24, and pressure regulating pumps 25. The support frame 21 is a frame structure with a T-shaped axial section, and an axis of the support frame 21 is perpendicular to a horizontal plane. The condensation chamber 24 is embedded in the support frame 21, coaxial with the support frame 21, and connected to a bottom of the support frame 21. The condensation chamber 24 includes a side wall provided with gas inlet 401 and a top provided with gas outlet 402. The gas inlet 401 is communicated with the cyclone separator 1, and the gas outlet 402 is communicated with a plurality of gas-liquid separators 22 through a guide tube. At least two gas-liquid separators 22 are embedded in an upper half of the support frame 21 and uniformly surround the axis of the support frame 21. The gas-liquid separators 22 are connected in parallel to each other and communicated with the gas outlet 402 of the condensation chamber 24 through the pressure regulating pumps 25. The refrigeration mechanism 23 is connected to an outer side of the support frame 21 and communicated with the mercury collection and separation mechanism 4 through a circulation loop. The gas-liquid separators 22, the refrigeration mechanism 23, the condensation chamber 24, and the pressure regulating pumps 25 are electrically connected to the driver circuit 6.

It should be noted that the condensation chamber 24 includes guide chamber 241, heat exchangers 242, aeration trays 243, and temperature sensor 422. The guide chamber 241 is a truncated cone-shaped structure, and a bottom of the guide chamber is provided with drain outlet 403 that is coaxial with the guide chamber. The gas inlet 401 is located at a side wall of the guide chamber 241, and is not less than 5 cm far from the bottom of the guide chamber 241. At least two aeration trays 243 are embedded in the guide chamber 241, connected to the bottom of the guide chamber 241, uniformly distributed around the drain outlet 403, and communicated with the gas inlet 401. At least two heat exchangers 242 are embedded in the guide chamber 241 and coaxial with the guide chamber 241. The heat exchangers 242 are connected to the side wall of the guide chamber 241. A distance between each two adjacent heat exchangers 242 is 10-30% of a height of the guide chamber 241. The heat exchangers 242 are connected in parallel to each other and communicated with the refrigeration mechanism 23 to form a closed circulation loop. The temperature sensor 422 is connected to a top of the condensation chamber 241 and electrically connected to the driver circuit 6.

It should be noted that the pressure buffer mechanism 3 includes buffer tank 31, elastic diaphragm 32, bearing keel 33, equalizing pump 34, counterweight 35, guide rails 36, pressure sensors 37, and wedge 38. An axis of the buffer tank 31 is perpendicular to the horizontal plane, and the buffer tank 31 is a cylindrical closed chamber structure with a rectangular axial section. A side wall of the buffer tank 31 is provided with at least one gas inlet 401. The gas inlet 401 uniformly surrounds the axis of the buffer tank 31, and a distance between the gas inlet 401 and a bottom of the buffer tank 31 is 5-15% of a height of the buffer tank 31. A top of the buffer tank 31 is provided with gas guide port 39 and communicated with an external pipe through the gas guide port 39. The bearing keel 33 is embedded in the buffer tank 31 and is a spoke-shaped frame structure coaxial with the buffer tank 31. The bearing keel 33 is slidably connected to an inner side of the buffer tank 31 through a plurality of guide rails 36. The elastic diaphragm 32 is wrapped around the bearing keel 33. The elastic diaphragm 32 and the bearing keel 33 jointly divide an inner space of the buffer tank 31 into the pressure regulating chamber 301 and the gas discharge chamber 302 that are independent of each other from top to bottom. The pressure equalizing pump 34 is located on the bearing keel 33 and coaxial with the bearing keel. The pressure regulating chamber 301 and the gas discharge chamber 302 are communicated with each other through the pressure equalizing pump 34. The counterweight 35 is a circular structure coaxial with the bearing keel 33 and is connected to an upper end surface of the bearing keel 33. At least two gas pressure sensors 37 are respectively connected to the upper end surface and a lower end surface of the bearing keel 33 and electrically connected to the driver circuit 6. At least one wedge 38 is embedded in the gas discharge chamber 302 and connected to the top of the buffer tank. The wedge has an axis perpendicular to the elastic diaphragm, and has a height not less than 10 cm. the pressure equalizing pump 34 is electrically connected to the driver circuit 6.

When the pressure buffer mechanism 3 performs a pressure regulating operation, first, a working pressure of the pressure equalizing pump 34 is set. Meanwhile, based on an output pressure parameter, a gravity of the counterweight 35 is set such that a total weight of the counterweight 35, the bearing keel 33, and the elastic diaphragm 32 is equal to 0-10% of an output pressure value. Then, external natural gas is delivered into the pressure regulating chamber 301. A gas pressure in the pressure regulating chamber 301 increases, and the bearing keel 33 is driven by the gas pressure to rise through the guide rails 36. Thus, a volume of the pressure regulating chamber 301 increases while a volume of the gas discharge chamber 302 decreases, thereby achieving the purpose of adjusting the volume of the pressure regulating chamber 301 and the volume of the gas discharge chamber 302. In addition, the gas pressure in the pressure regulating chamber 301 and the gas pressure in the gas discharge chamber 302 are detected through the gas pressure sensors 37. After the volume adjustment of the pressure regulating chamber 301 and the gas discharge chamber 302 is completed, the pressure regulating chamber 301 and the gas discharge chamber 302 are communicated with each other through the pressure equalizing pump 34. The pressure in the pressure regulating chamber 301 stabilized, and stable-pressure natural gas is delivered to the gas discharge chamber 302 until the pressure is balanced between the pressure regulating chamber 301 and the gas discharge chamber 302. Then, the natural gas in the gas discharge chamber 302 is discharged, that is, stable-pressure natural gas.

When the gas pressure at the input side decreases, the pressure in the gas discharge chamber 302 is stabilized through the pressure equalizing pump 34. Meanwhile, the bearing keel 33 is driven by a pressure difference between the gas discharge chamber 302 and the pressure regulating chamber 301, as well as weights of the bearing keel 33 and the counterweight 35, to fall along the guide rails 36. Thus, the volume of the pressure regulating chamber 301 is compressed, thereby achieving the purpose of stabilizing the gas pressure in the pressure regulating chamber 301. Similarly, when the gas pressure in the pressure regulating chamber 301 is greater than that in the gas discharge chamber 302, the gas pressure in the gas discharge chamber 302 is adjusted and stabilized by the pressure regulating pump 34. Meanwhile, the bearing keel 33 is driven by a pressure difference between the gas discharge chamber 302 and the pressure regulating chamber 301 to fall. Thus, the volume of the pressure regulating chamber 301 increases, thereby reducing the gas pressure in the pressure regulating chamber 301.

In addition, in case of an equipment malfunction due to the continuous rise of the bearing keel 33 caused by an excessive gas pressure in the pressure regulating chamber 301, as the bearing keel 33 rises, the elastic diaphragm 32 on the bearing keel 33 is punctured by the wedge 38. Thus, the pressure regulating chamber 301 and the gas discharge chamber 302 are quickly and directly communicated, thereby stabilizing the pressure to ensure the safe equipment operation. When the elastic diaphragm 32 is punctured, the equipment operation stops. The elastic diaphragm 32 needs to be repaired and an initial input gas pressure needs to be adjusted before experimentation is carried out again.

Further optimally, bearing spring 303 is provided in the guide rail 36, and the guide rail 36 is connected to the bearing keel 33 through the bearing spring 303. The bearing spring 303 is distributed in parallel to an axis of the guide rail 36. An upper end surface of the bearing keel 33 is provided with mounting groove 304 at the position corresponding to the counterweight 35. When there are two or more counterweights 35, the counterweights 35 are connected to the upper end surface of the bearing keel 33 and distributed in a concentric circular structure.

The bearing spring 303 is combined with the gas pressure in the pressure regulating chamber 301 to support the bearing keel 33, thereby improving the flexibility of adjustment when the bearing keel 33 is driven by the gas pressure in the pressure regulating chamber 301 to rise. Besides, when the bearing keel 33 is driven to fall by the weights of the bearing keel and the counterweight 35 connected to the bearing keel, as well as the pressure in the gas discharge chamber 302, the bearing spring 303 is combined with the gas pressure in the pressure regulating chamber 301 to support the bearing keel 33.

In this embodiment, the driver circuit 6 is a circuit system based on either a field-programmable gate array (FPGA) chip or a programmable controller. The driver circuit 6 is provided with a communication port and a control interface based on any one or a combination of a display, a button, and a potentiometer.

Figure 9:
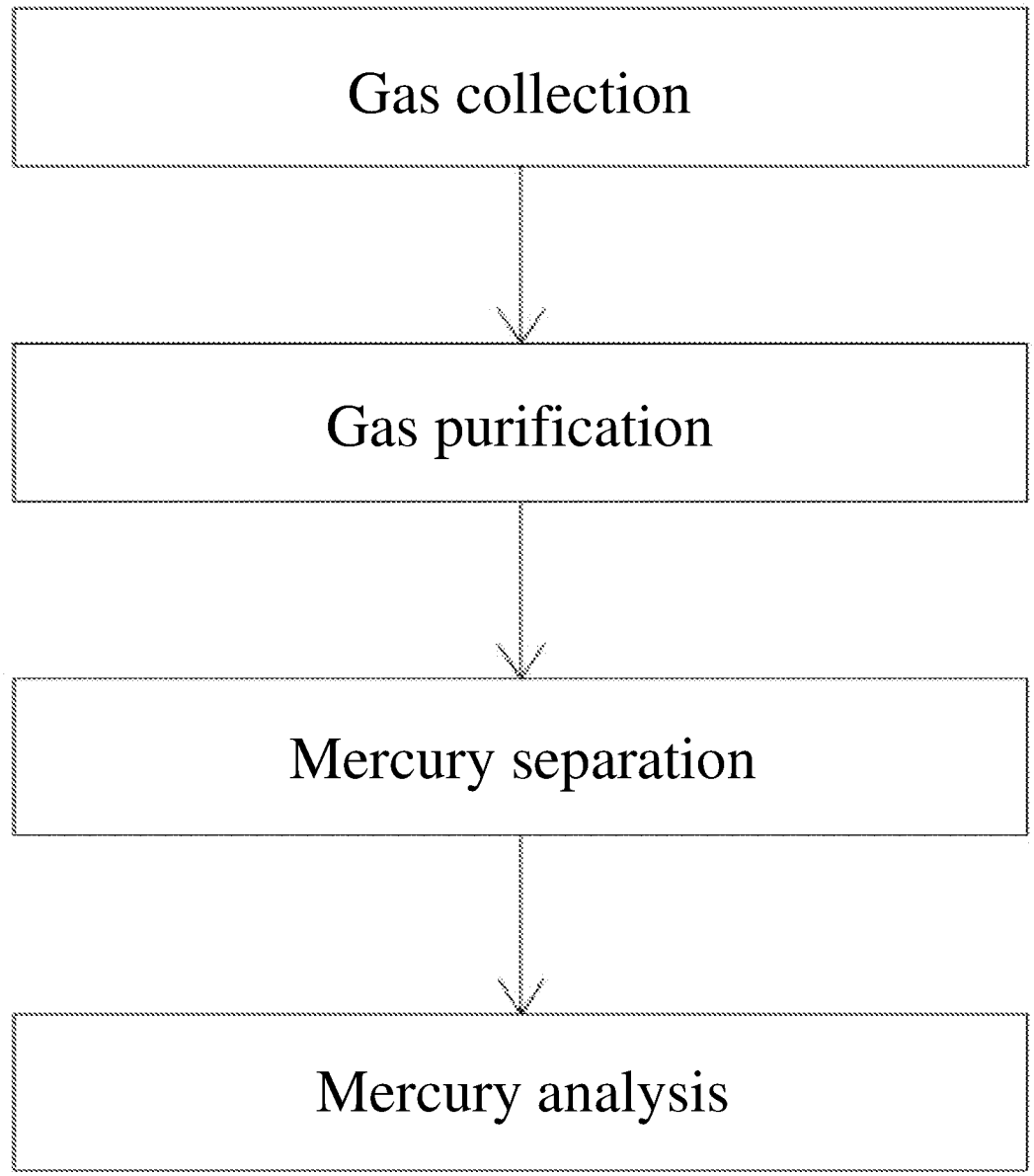
FIG. 9 is a flowchart of a method of use of the natural gas separation and purification and mercury collection system for oil and gas wells according to the present disclosure.

As shown in FIG. 9, a method of use of the natural gas separation and purification and mercury collection system in oil and gas wells includes the following steps.

S1: gas collection. The cyclone separator, the condensation purification and separation mechanism, the pressure buffer mechanisms, the mercury collection and separation mechanisms, and the natural gas storage tanks are vacuumed. After the vacuuming, the electric heating wire of the mercury collection and separation mechanism is driven to heat the gold foil meshes to 500-700° C., and the temperature is held for 3-5 min. After the holding, the gold foil meshes are cooled naturally to room temperature. The pressure buffer mechanism conducts a pressure regulation on high-pressure natural gas collected from an oil or gas well, and the regulated natural gas is delivered to the cyclone separator. The cyclone separator separates a solid particle and a liquid droplet in the natural gas to generate gaseous natural gas as initial experimental gas.

S2: gas purification. The pressure buffer mechanism conducts a secondary pressure regulation on the experimental gas generated in step S1. After the secondary pressure regulation, the experimental gas is delivered to the condensation purification and separation mechanism. The condensation purification and separation mechanism condenses an impurity in a vaporous form in the experimental gas through a low-temperature environment. The impurity separated in droplet and crystal forms is retained in the condensation purification and separation mechanism. The condensation purification and separation mechanism conducts gas-liquid separation on the experimental gas after the condensation purification. A secondary purification is conducted on the experimental gas to generate stable-pressure and clean experimental gas.

S3: mercury separation. The pressure buffer mechanism conducts a pressure regulation on the stable-pressure and clean experimental gas generated through the secondary purification in step S2. The stable-pressure and clean experimental gas is delivered to the mercury collection and separation mechanisms, and a total input amount of the experimental gas entering the mercury collection and separation mechanisms is detected. When the stable-pressure and clean experimental gas passes through the mercury collection and separation mechanism, the gold foil meshes in the mercury collection and separation mechanism reacts with mercury in the stable-pressure and clean experimental gas so as to generate amalgam, thereby separating the mercury from the natural gas. After the mercury separation, the natural gas is delivered to the natural gas storage tank. A storage capacity of the natural gas in the natural gas storage tank is compared with the total input amount of the experimental gas delivered to the mercury collection and separation mechanism to acquire a separated mercury content.

S4: mercury analysis. After the experimental gas is collected by the natural gas storage tank, the amalgam generated by the reaction in the mercury collection and separation mechanism is collected, and transferred to a mercury analysis device for analysis. Then, an isotopic content of the amalgam is determined, and a determined value is compared with the mercury content acquired in step S3. A correction is made to acquire an accurate natural gas content and an accurate mercury content in a mixed gas collected from the oil or gas well.

Compared with the prior art, the present disclosure has a high level of equipment integration and modularization and flexible and convenient operation. On the one hand, the present disclosure features simple operation, short sampling time, and sufficient mercury removal, and can effectively achieve the separation of natural gas and mercury, thereby improving the detection accuracy of mercury content in natural gas. On the other hand, the present disclosure avoids affecting normal production activities of the oil and gas industries during the sampling process, effectively improves the detection efficiency and accuracy, and reduces the operation and maintenance difficulty and cost of detection equipment.

It should be noted that relational terms herein such as first and second are merely used to distinguish one entity or operation from another entity or operation without necessarily requiring or implying any actual such relationship or order between such entities or operations. In addition, terms "include", "comprise", or their any other variations are intended to cover a non-exclusive inclusion, so that a process, a method, an article, or a device including a series of elements not only includes those elements, but also includes other elements that are not explicitly listed, or also includes inherent elements of the process, the method, the article, or the device. Without more restrictions, the elements defined by the sentence "including a . . . " do not exclude other identical elements in a process, method, article, or device including the elements.

In the specification of the present disclosure, terms "connect", "mount", "fix", and "provide" should be understood in a broad sense. For example, a connection may be a fixed connection, an indirect connection implemented through an intermediate component without affecting the component relationship or technical effect, an integrated connection, or a partial connection. Those of ordinary skill in the art should understand the specific meanings of the terms in the present disclosure based on the specific situation.

Although the embodiments of the present disclosure have been illustrated and described, it should be understood that those of ordinary skill in the art may make various changes, modifications, replacements and variations to the above embodiments without departing from the principle and spirit of the present disclosure, and the scope of the present disclosure is limited by the appended claims and their legal equivalents.

What is claimed is:

1. A natural gas separation and purification and mercury collection system for oil and gas wells, comprising a cyclone separator, a condensation purification and separation mechanism, pressure buffer mechanisms, mercury collection and separation mechanisms, natural gas storage tanks, and a driver circuit, wherein an inlet end of the cyclone separator is communicated with an external gas source through a first pressure buffer mechanism of the pressure buffer mechanisms, and an outlet end of the cyclone separator is communicated with the condensation purification and separation mechanism through a second pressure buffer mechanism of the pressure buffer mechanisms; the condensation purification and separation mechanism is communicated with the mercury collection and separation mechanism through a third pressure buffer mechanism of the pressure buffer mechanisms; the mercury collection and separation mechanism is communicated with the natural gas storage tank through a first guide tube; each of the cyclone separator, the condensation purification and separation mechanism, the pressure buffer mechanisms, the mercury collection and separation mechanisms, and the natural gas storage tanks is provided with a control valve; the cyclone separator, the condensation purification and separation mechanism, the pressure buffer mechanisms, the mercury collection and separation mechanisms, the natural gas storage tanks, and the control valve are electrically connected to the driver circuit; at least two mercury collection and separation mechanisms are connected in parallel to each other and communicated with the pressure buffer mechanisms and the natural gas storage tanks through a shunt.

2. The natural gas separation and purification and mercury collection system for oil and gas wells according to claim 1, wherein the mercury collection and separation mechanisms are connected to each other through a bearing frame; the bearing frame is a cylindrical frame with an I-shaped axial section; the mercury collection and separation mechanisms are embedded in a trough at a side surface of the bearing frame and distributed in parallel to an axis of the bearing frame; the pressure buffer mechanisms communicated with the mercury collection and separation mechanisms are connected to an outer side of the bearing frame; each of the mercury collection and separation mechanisms is communicated with a pressure buffer mechanism and communicated with the shunt through the pressure buffer mechanism; the shunt is connected to an upper end surface of the bearing frame; each of the mercury collection and separation mechanisms is further communicated with the natural gas storage tank through the shunt; a wall of the trough at the side surface of the bearing frame is provided with a guide way and connected to the mercury collection and separation mechanisms through the guide way; each two adjacent mercury collection and separation mechanisms are isolated by a partition; a bearing chamber is provided in the bearing frame and is coaxial with the bearing frame; the outer side of the bearing frame is provided with at least one connecting clip; a natural gas storage tank is provided in the bearing chamber; and the outer side of the bearing frame is connected to at least one natural gas storage tank through the at least one connecting clip.

3. The natural gas separation and purification and mercury collection system for oil and gas wells according to claim 1, wherein the mercury collection and separation mechanism comprises a separation tank, carriers, gold foil meshes, an aerator, a partition, a guide fan, heat exchange tubes, a temperature-humidity sensor, and pressure-flow sensors; the separation tank is a closed chamber structure with a rectangular axial section; the separation tank comprises an upper end surface provided with a gas inlet and a gas outlet, and a bottom provided with a drain outlet; the gas inlet and the gas outlet are distributed at two sides of an axis of the separation tank; the partition is embedded in the separation tank and connected to a top and a side wall of the separation tank; a distance between the partition and the bottom of the separation tank does not exceed 10% of a height of the separation tank; the partition divides the separation tank into a mercury removal chamber and a gas discharge chamber; the gas inlet is communicated with the mercury removal chamber, and the gas outlet is communicated with the gas discharge chamber; each of the carriers is a closed and circular structure, and is provided with 1-2 gold foil meshes; the carriers are embedded in the mercury removal chamber, coaxial with the mercury removal chamber, and slidably connected to an inner side of the mercury removal chamber through sliding rails; a distance between each two adjacent carriers is not less than 10 mm; the aerator is communicated with the gas inlet, located inside the mercury removal chamber, and connected to a top of the separation tank; there are at least two heat exchange tubes, comprising a first heat exchange tube located below the partition, connected to the bottom of the separation tank, and surrounding the axis of the separation tank, and a second heat exchange tube embedded in the gas discharge chamber and connected to a side wall of the separation tank corresponding to the gas discharge chamber; an outer side of the separation tank corresponding to the second heat exchange tube is provided with a pipe joint and communicated with the external condensation purification and separation mechanism through the pipe joint; the temperature-humidity sensor is embedded in the gas outlet; each of the gas inlet and the gas outlet is provided with a pressure-flow sensor; at least one guide fan is connected to the bearing frame and communicated with the gas outlet and the shunt through a second guide tube; the at least one guide fan is communicated with the natural gas storage tank through the shunt; and the at least one guide fan, the temperature-humidity sensor, and the pressure-flow sensors are electrically connected to the driver circuit.

4. The natural gas separation and purification and mercury collection system for oil and gas wells according to claim 3, wherein at least one electric heating wire and a temperature sensor are further provided in each of the carriers; the at least one electric heating wire is spirally distributed around an axis of the carrier, and is 0-5 mm far from the gold foil mesh; the temperature sensor is coaxial with the carrier; and the at least one electric heating wire and the temperature sensor are electrically connected to the driver circuit.

5. The natural gas separation and purification and mercury collection system for oil and gas wells according to claim 1, wherein the condensation purification and separation mechanism comprises a support frame, gas-liquid separators, a refrigeration mechanism, a condensation chamber, and pressure regulating pumps; the support frame is a frame structure with a T-shaped axial section, and an axis of the support frame is perpendicular to a horizontal plane; the condensation chamber is embedded in the support frame, coaxial with the support frame, and connected to a bottom of the support frame; the condensation chamber comprises a side wall provided with a first gas inlet and a top provided with a gas outlet; the first gas inlet is communicated with the cyclone separator, and the gas outlet is communicated with a plurality of gas-liquid separators through a second guide tube; the plurality of gas-liquid separators are embedded in an upper half of the support frame and uniformly surround the axis of the support frame; the plurality of gas-liquid separators are connected in parallel to each other and communicated with the gas outlet of the condensation chamber through the pressure regulating pumps; the refrigeration mechanism is connected to an outer side of the support frame and communicated with the mercury collection and separation mechanism through a circulation loop; and the plurality of gas-liquid separators, the refrigeration mechanism, the condensation chamber, and the pressure regulating pumps are electrically connected to the driver circuit.

6. The natural gas separation and purification and mercury collection system for oil and gas wells according to claim 5, wherein the condensation chamber comprises a guide chamber, heat exchangers, aeration trays, and a temperature sensor; the guide chamber is a truncated cone-shaped structure; a bottom of the guide chamber is provided with a drain outlet, wherein the drain outlet is coaxial with the guide chamber; the first gas inlet is located at a side wall of the guide chamber, and is not less than 5 cm far from the bottom of the guide chamber; at least two aeration trays are embedded in the guide chamber, connected to the bottom of the guide chamber, uniformly distributed around the drain outlet, and communicated with the first gas inlet; at least two heat exchangers are embedded in the guide chamber and coaxial with the guide chamber; the at least two heat exchangers are connected to the side wall of the guide chamber; a distance between each two adjacent heat exchangers is 10-30% of a height of the guide chamber; the at least two heat exchangers are connected in parallel to each other and communicated with the refrigeration mechanism to form a closed circulation loop; and the temperature sensor is connected to a top of the condensation chamber and electrically connected to the driver circuit.

7. The natural gas separation and purification and mercury collection system for oil and gas wells according to claim 5, wherein each of the pressure buffer mechanisms comprises a buffer tank, an elastic diaphragm, a bearing keel, a pressure equalizing pump, a counterweight, a plurality of guide rails, pressure sensors, and a wedge; an axis of the buffer tank is perpendicular to the horizontal plane, and the buffer tank is a cylindrical closed chamber structure with a rectangular axial section; a side wall of the buffer tank is provided with at least one second gas inlet; the at least one second gas inlet uniformly surrounds the axis of the buffer tank, and a distance between the at least one second gas inlet and a bottom of the buffer tank is 5-15% of a height of the buffer tank; a top of the buffer tank is provided with a gas guide port and communicated with an external pipe through the gas guide port; the bearing keel is embedded in the buffer tank and is a spoke-shaped frame structure coaxial with the buffer tank; the bearing keel is slidably connected to an inner side of the buffer tank through the plurality of guide rails; the elastic diaphragm is wrapped around the bearing keel; the elastic diaphragm and the bearing keel jointly divide an inner space of the buffer tank into a pressure regulating chamber and a gas discharge chamber from top to bottom, wherein the pressure regulating chamber and the gas discharge chamber are independent of each other; the pressure equalizing pump is located on the bearing keel and coaxial with the bearing keel; the pressure regulating chamber and the gas discharge chamber are communicated with each other through the pressure equalizing pump; the counterweight is a circular structure coaxial with the bearing keel and is connected to an upper end surface of the bearing keel; at least two gas pressure sensors are respectively connected to the upper end surface and a lower end surface of the bearing keel and electrically connected to the driver circuit; at least one wedge is embedded in the gas discharge chamber and connected to the top of the buffer tank; and the at least one wedge has an axis perpendicular to the elastic diaphragm, and has a height not less than 10 cm.

8. The natural gas separation and purification and mercury collection system for oil and gas wells according to claim 7, wherein a bearing spring is provided in each guide rail of the plurality of guide rails, and the guide rail is connected to the bearing keel through the bearing spring; the bearing spring is distributed in parallel to an axis of the guide rail; the upper end surface of the bearing keel is provided with a mounting groove at a position corresponding to the counterweight; and when there are two or more counterweights, the two or more counterweights are connected to the upper end surface of the bearing keel and distributed in a concentric circular structure.

9. The natural gas separation and purification and mercury collection system for oil and gas wells according to claim 1, wherein the driver circuit is a circuit system based on either a field-programmable gate array (FPGA) chip or a programmable controller; and the driver circuit is provided with a communication port and a control interface, wherein the control interface is based on any one or a combination of a display, a button, and a potentiometer.

10. A method of use of the natural gas separation and purification and mercury collection system in oil and gas wells according to claim 1, comprising the following steps:

S1: gas collection: vacuuming the cyclone separator, the condensation purification and separation mechanism, the pressure buffer mechanisms, the mercury collection and separation mechanisms, and the natural gas storage tanks; driving, after the vacuuming, the electric heating wire of the mercury collection and separation mechanism to heat the gold foil meshes to 500-700° C., and holding the temperature for 3-5 min; cooling, after the holding, the gold foil meshes naturally to room temperature; conducting, by the pressure buffer mechanism, a pressure regulation on high-pressure natural gas collected from an oil or gas well, and delivering the regulated natural gas to the cyclone separator; and separating, by the cyclone separator, a solid particle and a liquid droplet in the natural gas to generate gaseous natural gas as initial experimental gas;

S2: gas purification: conducting, by the pressure buffer mechanism, a secondary pressure regulation on the experimental gas generated in step S1; delivering, after the secondary pressure regulation, the experimental gas to the condensation purification and separation mechanism; condensing, by the condensation purification and separation mechanism, an impurity in a vaporous form in the experimental gas through a low-temperature environment; retaining the impurity separated in droplet and crystal forms in the condensation purification and separation mechanism; conducting, by the condensation purification and separation mechanism, gas-liquid separation on the experimental gas after the condensation purification; and conducting a secondary purification on the experimental gas to generate stable-pressure and clean experimental gas;

S3: mercury separation: conducting, by the pressure buffer mechanism, a pressure regulation on the stable-pressure and clean experimental gas generated through the secondary purification in step S2; delivering the stable-pressure and clean experimental gas to the mercury collection and separation mechanisms, and detecting a total input amount of the experimental gas entering the mercury collection and separation mechanisms; allowing, when the stable-pressure and clean experimental gas passes through the mercury collection and separation mechanism, the gold foil meshes in the mercury collection and separation mechanism to react with mercury in the stable-pressure and clean experimental gas so as to generate amalgam, thereby separating the mercury from the natural gas; delivering, after the mercury separation, the natural gas to the natural gas storage tank; and comparing a storage capacity of the natural gas in the natural gas storage tank with the total input amount of the experimental gas delivered to the mercury collection and separation mechanism to acquire a separated mercury content; and S4: mercury analysis: collecting, after the experimental gas is collected by the natural gas storage tank, the amalgam generated by the reaction in the mercury collection and separation mechanism; transferring the collected amalgam to a mercury analysis device for analysis, and then determining an isotopic content of the amalgam; and comparing a determined value with the mercury content acquired in step S3, and making a correction to acquire an accurate natural gas content and an accurate mercury content in a mixed gas collected from the oil or gas well.

11. The natural gas separation and purification and mercury collection system for oil and gas wells according to claim 2, wherein the mercury collection and separation mechanism comprises a separation tank, carriers, gold foil meshes, an aerator, a partition, a guide fan, heat exchange tubes, a temperature-humidity sensor, and pressure-flow sensors; the separation tank is a closed chamber structure with a rectangular axial section; the separation tank comprises an upper end surface provided with a gas inlet and a gas outlet, and a bottom provided with a drain outlet; the gas inlet and the gas outlet are distributed at two sides of an axis of the separation tank; the partition is embedded in the separation tank and connected to a top and a side wall of the separation tank; a distance between the partition and the bottom of the separation tank does not exceed 10% of a height of the separation tank; the partition divides the separation tank into a mercury removal chamber and a gas discharge chamber; the gas inlet is communicated with the mercury removal chamber, and the gas outlet is communicated with the gas discharge chamber; each of the carriers is a closed and circular structure, and is provided with 1-2 gold foil meshes; the carriers are embedded in the mercury removal chamber, coaxial with the mercury removal chamber, and slidably connected to an inner side of the mercury removal chamber through sliding rails; a distance between each two adjacent carriers is not less than 10 mm; the aerator is communicated with the gas inlet, located inside the mercury removal chamber, and connected to a top of the separation tank; there are at least two heat exchange tubes, comprising a first heat exchange tube located below the partition, connected to the bottom of the separation tank, and surrounding the axis of the separation tank, and a second heat exchange tube embedded in the gas discharge chamber and connected to a side wall of the separation tank corresponding to the gas discharge chamber; an outer side of the separation tank corresponding to the second heat exchange tube is provided with a pipe joint and communicated with the external condensation purification and separation mechanism through the pipe joint; the temperature-humidity sensor is embedded in the gas outlet; each of the gas inlet and the gas outlet is provided with a pressure-flow sensor; at least one guide fan is connected to the bearing frame and communicated with the gas outlet and the shunt through a second guide tube; the at least one guide fan is communicated with the natural gas storage tank through the shunt; and the at least one guide fan, the temperature-humidity sensor, and the pressure-flow sensors are electrically connected to the driver circuit.

12. The natural gas separation and purification and mercury collection system for oil and gas wells according to claim 11, wherein at least one electric heating wire and a temperature sensor are further provided in each of the carriers; the at least one electric heating wire is spirally distributed around an axis of the carrier, and is 0-5 mm far from the gold foil mesh; the temperature sensor is coaxial with the carrier; and the at least one electric heating wire and the temperature sensor are electrically connected to the driver circuit.

* * * * *